US012679695B2

(12) United States Patent
Miyamae et al.

(10) Patent No.: US 12,679,695 B2
(45) Date of Patent: Jul. 14, 2026

(54) TESTING METHOD FOR UNINTENDED CAR MOVEMENT PROTECTION DEVICE FOR ELEVATORS AND UNINTENDED CAR MOVEMENT PROTECTION DEVICE FOR ELEVATORS

(71) Applicant: Hitachi, Ltd., Tokyo (JP)

(72) Inventors: Masaki Miyamae, Tokyo (JP); Koichi Yamashita, Tokyo (JP); Jun Toriyabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1240 days.

(21) Appl. No.: 17/596,918

(22) PCT Filed: Jul. 5, 2019

(86) PCT No.: PCT/JP2019/026862

§ 371 (c)(1),
(2) Date: Dec. 21, 2021

(87) PCT Pub. No.: WO2021/005656

PCT Pub. Date: Jan. 14, 2021

(65) Prior Publication Data

US 2022/0315383 A1 Oct. 6, 2022

(51) Int. Cl.
*B66B 5/00* (2006.01)
*B66B 5/02* (2006.01)
(Continued)

(52) U.S. Cl.
CPC .......... *B66B 5/0093* (2013.01); *B66B 5/0037* (2013.01); *B66B 5/02* (2013.01); *B66B 1/3492* (2013.01); *B66B 13/22* (2013.01)

(58) Field of Classification Search
None
See application file for complete search history.

(56) References Cited

U.S. PATENT DOCUMENTS

2011/0272216 A1 11/2011 Kugiya et al.

FOREIGN PATENT DOCUMENTS

CN 106365008 A * 2/2017 ............ B66B 5/021
JP 2007-55691 A 3/2007
(Continued)

OTHER PUBLICATIONS

International Search Report (PCT/ISA/210) issued in PCT Application No. PCT/JP2019/026862 dated Aug. 20, 2019 with English translation (five (5) pages).
(Continued)

*Primary Examiner* — Michelle M Iacoletti
(74) *Attorney, Agent, or Firm* — Crowell & Moring LLP

(57) ABSTRACT

A testing method for an unintended car movement protection device for an elevator, which can shorten the time required for performing the operation test, is disclosed. The testing method includes: moving a car to a position where a floor releveling operation is enabled; making an unintended car movement protection device operate for testing; enabling the floor releveling operation by an elevator control device to control the car by way of a command signal from a control device of the unintended car movement protection device while the control device of the unintended car movement protection device simulatively sets an opened door detection state in which a car door or a landing door is detected to be opened and a power cut-off command signal to be outputted to an electric motor to drive the car; performing the floor releveling operation by way of the elevator control device in such a closed door state that the car door and the landing door are being closed; and making the car in the closed door state move by unbalanced torque in accordance with the power cut-off command signal when the car lands on a releveled floor through the floor releveling operation.

9 Claims, 4 Drawing Sheets

(51) Int. Cl.

| | |
|---|---|
| *B66B 1/34* | (2006.01) |
| *B66B 13/22* | (2006.01) |

(56) References Cited

FOREIGN PATENT DOCUMENTS

| | | | |
|---|---|---|---|
| JP | 2012-6758 | A | 1/2012 |
| JP | 2012-6759 | A | 1/2012 |
| WO | WO 2010/095242 | A1 | 8/2010 |
| WO | WO 2010/100802 | A1 | 9/2010 |

OTHER PUBLICATIONS

Japanese-language Written Opinion (PCT/ISA/237) issued in PCT Application No. PCT/JP2019/026862 dated Aug. 20, 2019 (four (4) pages).

Hindi-language Office Action issued in Indian Application No. 202117060054 dated Jun. 23, 2022 with English translation (six (6) pages).

* cited by examiner

TESTING METHOD FOR UNINTENDED CAR MOVEMENT PROTECTION DEVICE FOR ELEVATORS AND UNINTENDED CAR MOVEMENT PROTECTION DEVICE FOR ELEVATORS

TECHNICAL FIELD

The present invention relates to a testing method for checking the operation of an unintended car movement protection device for elevators and the unintended car movement protection device that is optimal for adopting the testing method.

BACKGROUND ART

The unintended car movement protection (UCMP) device prevents a car for elevators from moving in such a state that car doors and landing doors are being opened. For the UCMP device, the test for checking its operation is performed.

The prior art regarding the testing method for such UCMP device is known from the disclosure of Patent Literature 1. In this prior art, after the car has been moved out of the zone permitting the door to be opened and halted there while the car doors and the landing doors are being closed, the command to move the car is given to the operation control device in such a state that the car doors are being opened. At this time, it is checked that the electric motor of a traction machine is halted and the braking device is placed into the braking mode.

CITATION LIST

Patent Literature

Patent Literature 1: Japanese Patent Application Laid-Open No. 2012-6759

SUMMARY OF INVENTION

Technical Problem

According to the above prior art, the longer test time is required, since the electric motor of the traction machine is driven so as for the car to be moved.

Thus, the present invention is to provide the testing method for an unintended car movement protection device for elevators which can reduce the test time and the unintended car movement protection device for an elevator.

Solution to Problem

In order to solve the above problem, a testing method according to the present invention for an unintended car movement protection device for an elevator to check the operation of the unintended car movement protection device with which an elevator system is provided includes: moving a car to a position where a floor releveling operation is enabled by way of, e.g., maintenance operation or purposely displacing the landing position of an elevator; making the unintended car movement protection device operate for testing; enabling the floor releveling operation by an elevator control device to control the car by way of a command signal from a control device of the unintended car movement protection device while the control device of the unintended car movement protection device simulatively sets an opened door detection state in which car doors or landing doors are detected to be opened and a power cut-off command signal to be outputted to an electric motor to drive the car; performing the floor releveling operation by way of the elevator control device in such a closed door state that the car doors and the landing doors are being closed; and checking an operation of the unintended car movement protection device by making the car in the closed door state move by unbalanced torque in accordance with the power cut-off command signal when the car lands on a releveled floor through the floor releveling operation.

Further, in order to solve the above problem, an unintended car movement protection device for an elevator according to the present invention includes opened or closed door detection means including a car door switch and a landing door switch; position detection means for detecting a position of a car in a hoistway; and a control device to place a braking device into a braking mode and to cut off power supply to an electric motor to drive the car when it is determined based on a signal from the opened or closed door detection means and the position detection means respectively that the car entails unintended car movement, wherein the control device enables a floor releveling operation by way of an elevator control device to control an operation of the car when making the unintended car movement protection device operate for testing to check an operation of the unintended car movement protection device while simulatively setting an opened door detection state of the opened or closed door detection means and the power supply to the electric motor to be cut off when the car lands on a releveled floor through the floor releveling operation.

Advantageous Effects of Invention

According to the present invention, the shorter testing time for the unintended car movement protection device is achieved.

Problems, features and effects other than ones described above will be apparent from the description of an embodiment below.

DESCRIPTION OF EMBODIMENT

Hereafter, the embodiment of the present invention is explained with reference to the accompanying drawings. In each drawing, what has the same reference sign denotes the same feature or a feature provided with similar function.

Figure 1:
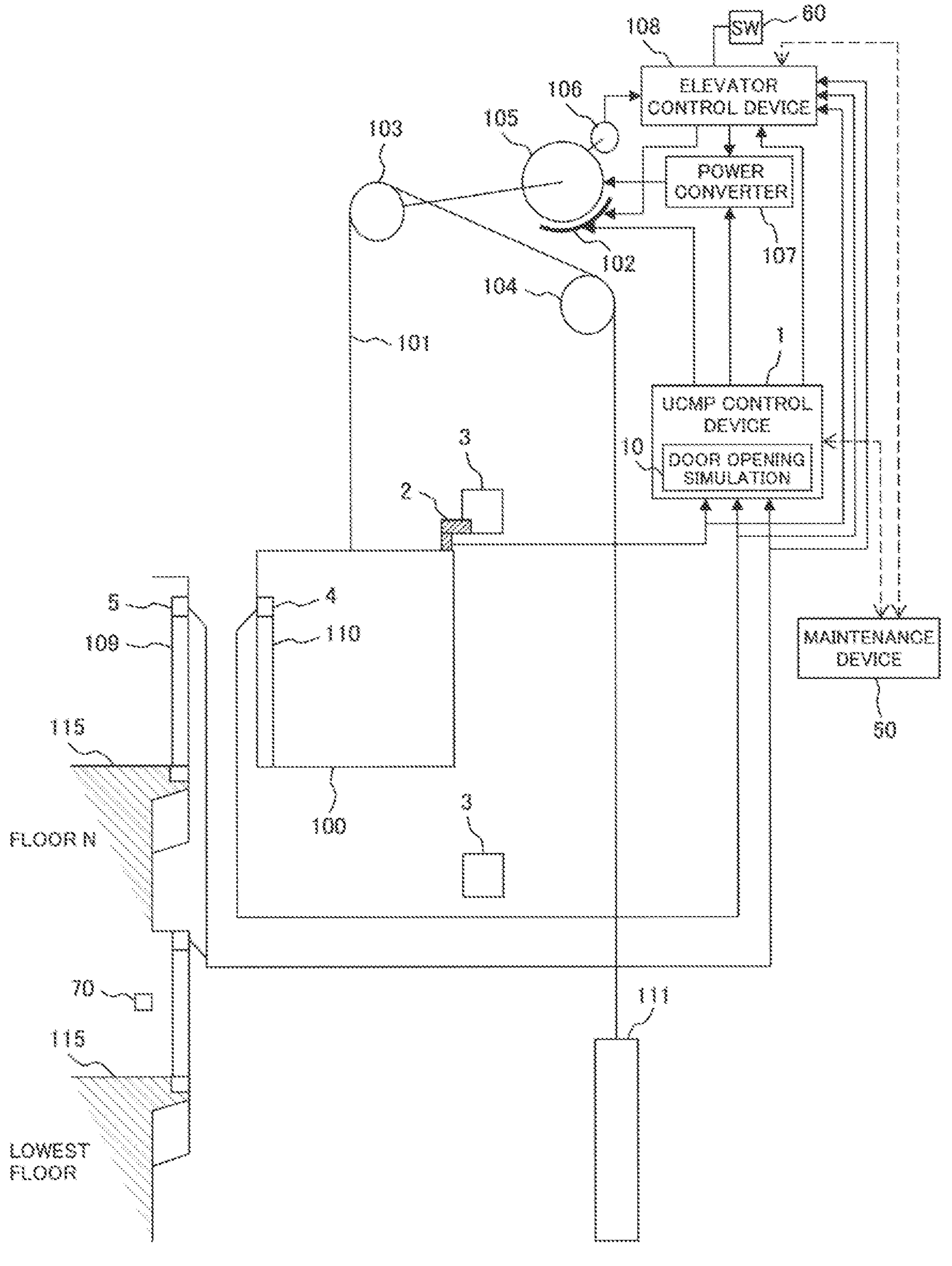
FIG. 1 is a view to illustrate the whole structural arrangement of an elevator system according to one embodiment of the present invention.

FIG. 1 is a view to illustrate the whole structural arrangement of an elevator system according to one embodiment of the present invention. As explained below, the present elevator system is provided with an unintended car movement protection device, for which the unintended car movement protection device the test for checking its operation is performed.

As illustrated in FIG. 1, a car 100 which moves through plural floors in a hoistway formed through a building is connected to a counter weight 111 through a main rope 101. The main rope 101 is wound around a traction sheave 103 which is mechanically connected to a revolving shaft of an electric motor 105 and a deflector sheave 104. Thereby, the car 100 and the counter weight 111 are suspended by the main rope 101 in the hoistway.

When the main rope 101 being driven by the traction sheave 103 is rotatably driven by the electric motor 105, the car 100 and the counter weight 111 move vertically opposed to each other through the hoistway. The electric motor 105 (permanent magnet synchronous motor, for example) is driven by power supplied from a power converter 107 (inverter device, for example) and braked with a braking device 102 when the car 100 is halted.

Further, an encoder 106 which is a pulse generator attached to the electric motor 105 generates a pulse signal according to the revolution of the electric motor. An elevator control device 108 computes the speed of the electric motor 105, a position of the car 100 with respect to the moving direction within the hoistway and its travel distance by counting such pulse signal. Then, the elevator control device 108 controls an operation of the car 100 by controlling the electric motor 105 by way of the power converter 107 based on the computational result. The car 100 is provided with a car door 110 which is engaged with a landing door 109 which is a landing side door and is the car side door to be opened or closed along with the landing door 109.

A UCMP control device 1 is a controller provided with unintended car movement protection function and controls the braking of the car 100 by way of braking operation and cutting off power source independently of the elevator control device 108. The UCMP control device 1 mainly includes a CPU (Central Processing Unit) to execute processing and realizes the unintended car movement protection function by the CPU executing the prescribed programs. To note, the elevator control device 108 is provided with a CPU as well, but the CPU with which the UCMP control device 1 is provided and the CPU with which the elevator control device 108 is provided are independent of each other.

When the UCMP control device 1 determines based on a signal inputted from a position sensor 2, a car door switch 4 to detect the opening or closing of the car door 110, and a landing door switch 5 to detect the opening or closing of the landing door 109 respectively that the car 100 locates on a position away by farther than a certain specific distance from the landing in the hoistway and any one of the car door 110 and the plural landing doors 109 is opened or the car 100 is found in the unintended car movement state, it outputs the command to operate the braking device 102 and the command to cut off power source of the power converter 107.

In this regard, what is referred to as the certain specific distance above denotes the vertical distance from the landing floor surface (reference landing position) over which the movement of the car 100 in its opened state is permitted.

In the case of the car 100 starting to move while the car door 110 and the plural landing doors 109 are open, such certain specific distance is set such that the height of the opening of the cab seen from the landing secures the height necessary to prevent from being caught and the height of a gap generated under the floor of the car is such a securable height as to prevent a passenger from falling in the hoistway.

The position sensor 2 which is provided on the car 100 detects that the car 100 locates within the range of such certain specific distance by detecting a detection object 3 which is fixedly disposed in the hoistway. To note, such certain specific distance is set within the positional range (hereinafter, referred to as 'door zone') enabling the door opening operation in the hoistway. Within the door zone, the car door 110 and the landing door 109 are engaged with each other by an engagement device, and the car door 110 and the landing door 109 are opened or closed together when the car door 110 is driven by a door driving device (not show in the drawings) which is provided on the car 100 and controlled by the elevator control device 108.

It should be noted that the door zone is taken into account for the regular operation control as well. In the regular operation control, upon being detected by the position sensor 2 that the moving car 100 has entered within the door zone at a floor where the car is halted, the elevator control device 108 controls the electric motor 105 by way of the power converter 107 such that the car 100 lands on such floor and halts there.

Such non-contact type detection sensors as photoelectric type ones, magnetic type ones (such as magnet type ones and high-frequency magnetic field type ones) and the static capacitance type ones are adoptable for the position sensor 2. To note, in the present embodiment, provided that the range covered by such certain specific distance corresponds to the door zone, the position sensor 2 is usable for both the unintended car movement determination and the regular operation control. This permits the number of parts to reduce. In turn, even when the range covered by such certain specific distance corresponds to the door zone, it may be arranged such that the position sensor 2 is exclusively used for the unintended car movement determination and another sensor is provided for the regular operation control. In this case, the reliable security system is enhanced.

To note, when the door opening tolerance zone differs from such certain specific distance, a certain specific distance sensing device is provided on the car separately from the position sensor used for the regular operation control. The same non-contact type detection sensors as used for the position sensor 2 are adoptable for such certain specific distance sensing device, for example. In this case, such certain specific distance sensing device is connected to the UCMP control device 1 on behalf of the position sensor 2 in the present embodiment. It should be noted that it may be arranged such that the position sensor is provided with the certain specific distance sensing function in addition to the door opening tolerance zone sensing function.

The command to actuate the brake which is outputted by the UCMP control device 1 is a command signal to make the braking device 102 actuate so as to make braking force generated on the braking device 102 by cutting off power source supplied to the braking device 102, thereby, putting a brake on the car 100. Further, the command to cut off power source which is outputted by the UCMP control device 1 is a command signal to cut off the power source of the power converter 107 so as to make the electric motor 105 halt by stopping power supply to the power converter 107. Due to such command signals, the car 100 is braked and halted so as to be kept being stopped.

During the regular operation, the elevator control device 108 controls the operation of the car 100 by controlling the power converter 107 and the braking device 102 whereas when the unintended car movement is detected, the UCMP control device 1 makes the car 100 braked and halted by controlling the actuation of the brake and power source cut-off.

When the test for checking the operation of the unintended car movement protection device including the above-mentioned UCMP control device 1, car door switch 4, plural landing door switches 5, position sensor 2, and detection object 3 is performed, a maintenance device 50 is connected to the UCMP control device 1 and the elevator control device 108 in an electrical and communicative manner. The maintenance device 50 includes a portable computer or a terminal device and determines the conditions of the elevator equipment by acquiring the operating data of such equipment and manipulates the operation of the car during the maintenance and inspection work. To note, in the present embodiment, the maintenance device 50 is delivered to the installation site of the elevator subject to maintenance test and is used by a maintenance engineer during a series of maintenance testing procedures.

At the time of performing test on the unintended car movement protection device, first, the maintenance device 50 is connected to the UCMP control device 1 and the elevator control device 108 in an electrical and communicative manner while switching the operation mode from the regular one to the maintenance one by manipulating the specific switch among a group of maintenance switches 60 (SW) which is electrically connected to the elevator control device 108. This permits the maintenance device 50 to manipulate the low-speed operation and halting of the car and the opening and closing drive of the car door 110.

The car 100 landing on the floor in halt is moved to a position enabling a floor releveling operation through the manipulation of the maintenance device 50. In this regard, during the floor releveling operation, the elevator control device 108 detects a step between the floor surface of the car 100 and the floor surface of the landing 115 when the car 100 lands on the releveled floor in halt and makes the car 100 operate and land on the releveled floor in halt again when such step is higher than the prescribed value so as to make such step contained within such value.

It should be noted that the floor releveling operation is performed during the regular operation while being disabled during the maintenance operation by the elevator control device 108. At the time of performing test on the unintended car movement protection device, the floor releveling operation is enabled in the UCMP control device 1. Therefore, the automatic floor releveling operation is performed by switching the operation mode switched over by the maintenance device 50 from the maintenance operation to the regular one.

After the car has moved to a position where the floor releveling operation is enabled, when the door opening or closing command signal is outputted from the maintenance device 50 to the elevator control device 108 through the manipulation of the maintenance engineer, the car door 110 and the landing door 109 at a floor where the car is halted are closed. Hereupon, the car 100 is placed into the testing operation stand-by state, the testing operation including the automatic floor releveling operation for performing test on the unintended car movement protection device.

When the soft and hard protectors are removed by the maintenance engineer in the testing operation stand-by mode of the car 100, the UCMP control device 1 switches the operation mode from the regular mode to the testing mode. In the testing mode, irrespective of the opened or closed door state detection signals from the car door switch 4 and the landing door switches 5, the opened door detection state is set by an door opening simulation unit 10 of the UCMP control device 1. In the present embodiment, the door opening simulation unit 10 cuts off the closed door state detection signals from the car door switch 4 and the landing door switches 5, thereby, the UCMP control device 1 determining that the car door 110 and the landing door 109 are opened even when the car doors 110 and the landing doors 109 are closed. At the same time, the UCMP control device 1 outputs a power source cut-off command to cut off the power source of the power converter 107, at which time the command to actuate the braking device 102 is enabled.

When the operation mode of the UCMP control device 1 is switched over to the testing mode, the command to perform the floor releveling operation is given by switching the maintenance operation mode set by the maintenance device 50 over to the regular operation one, thereby, the test on the unintended car movement protection device is performed in the closed door state. In this test, first, the automatic floor releveling operation is performed by the elevator control device 108.

At this time, the UCMP control device 1 does not output the brake actuation command at the same time as outputting the power source cut-off command so as to place the braking device 102 into its open condition and the electric motor 105 does no generate torque, so that the traction sheave 103 rotates by unbalanced torque due to a difference of weight between the car 100 and the counter weight 111. This moves the car 100 to the ascending (descending) direction from the landing position. Then, the UCMP control device 1 determines that the car is in its opened door state since the opened door detection state is set by the door opening simulation unit 10, and outputs the brake actuation command upon determining based on the position detection signal from the position sensor 2 that the position of the car 100 is away by farther than the certain specific distance from the landing or determining that the car 100 is found in the unintended car movement state. Thereby, the car 100 is braked by the braking device 102 so as to be halted.

Once the maintenance engineer confirms the halt of the car 100 by way of the maintenance device 50, he or she opens the landing doors 109 and measures the distance between the floor surface of the landing 115 and that of the car 100 or the braking distance (FIG. 4) so as to check whether the measured value is within the prescribed tolerable range.

Subsequently, the testing method for the unintended car movement protection device according to the present embodiment is explained.

Figure 2:
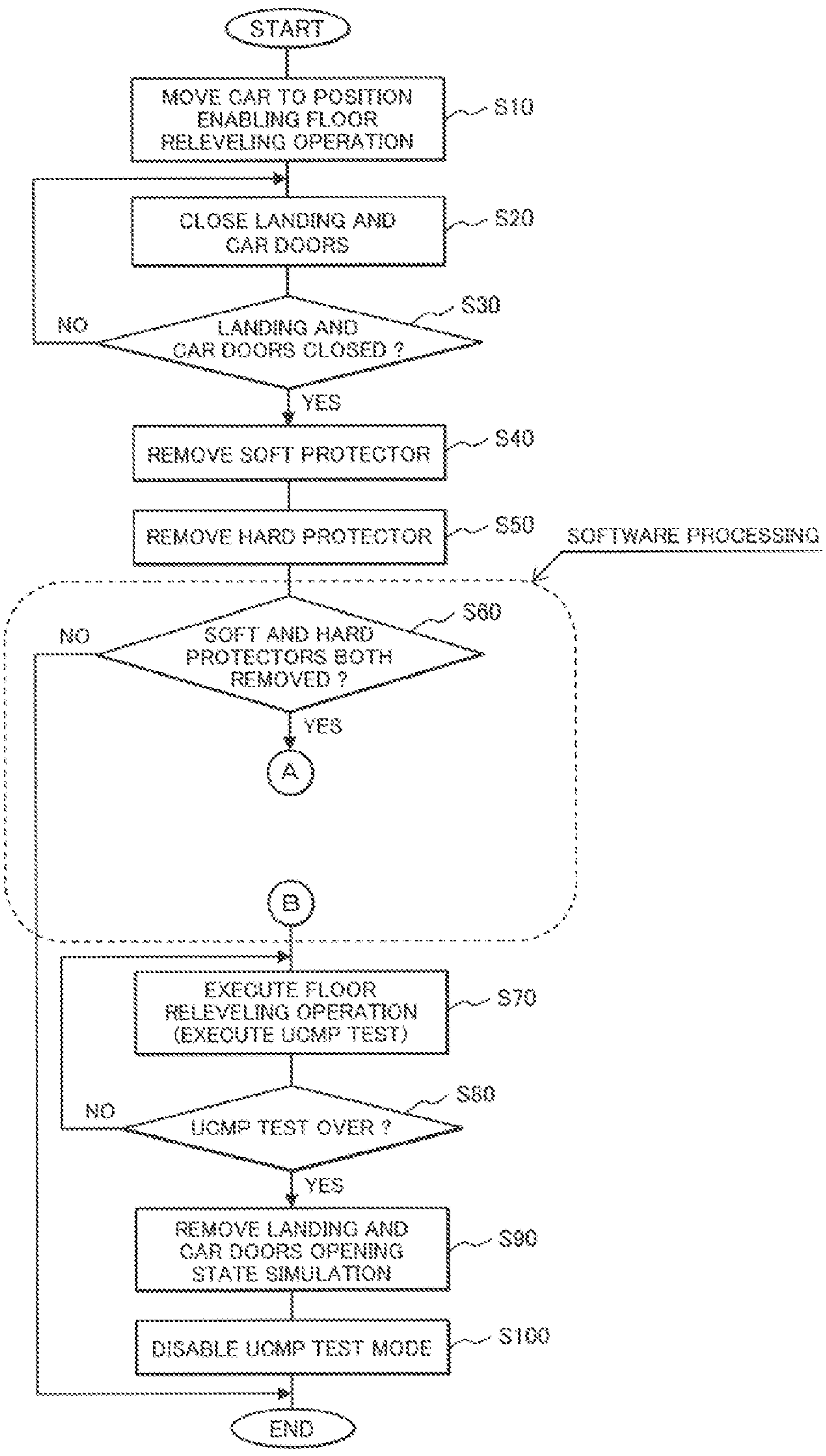
FIG. 2 is a flow chart to illustrate the testing method for an unintended car movement protection device according to the present embodiment.

FIG. 2 is a flow chart to illustrate the testing method for the unintended car movement protection device according to the present embodiment. Further, FIG. 3 is a flow chat to illustrate the steps over A and B with reference to the flow chart depicted in FIG. 2.

Figure 3:
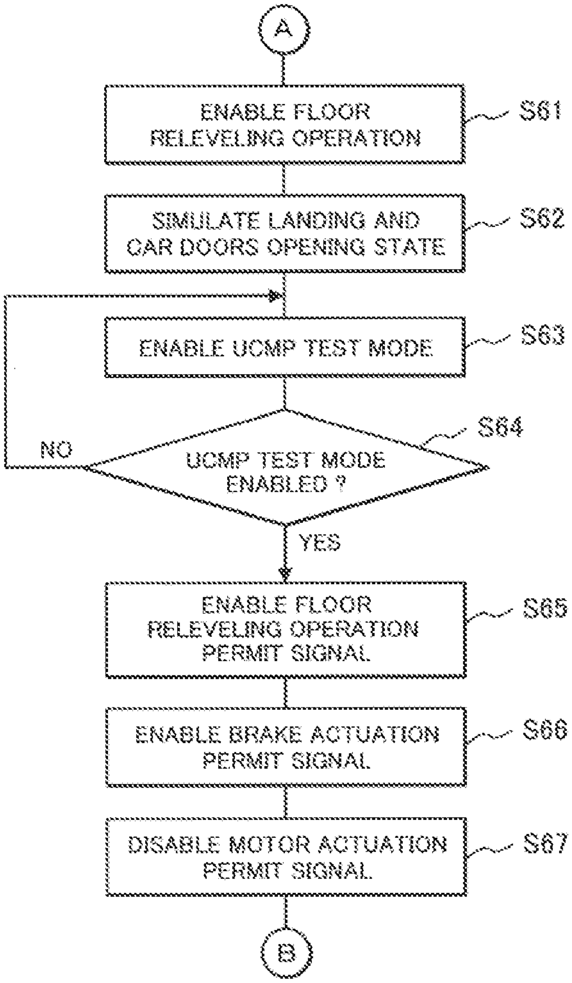
FIG. 3 is a flow chat to illustrate the steps over A and B with reference to the flow chart depicted in FIG. 2.

Each step depicted in FIGS. 2 and 3 is performed by one of the maintenance engineer, the maintenance device 50, the elevator control device 108, and the UCMP control device 1. To note, the step enclosed by a dotted line is concerned with processing by software and is performed mainly by the UCMP control device 1.

Before the test on the unintended car movement protection device is performed according to the testing method depicted in FIGS. 2 and 3, the maintenance engineer manipulates the specific switch among a group of maintenance switches 60 (SW) so as to switch the operation mode from the regular one to the maintenance one.

First, at Step S10, the maintenance engineer manipulates the maintenance device 50 so as to operate the car 100 and move it to a position where the floor releveling operation is enabled.

Then, at Step S20, the maintenance engineer manipulates the maintenance device 50 so as to drive the door driving device and close the landing and car doors.

Next, at Step S30, the maintenance engineer visually checks whether the landing and car doors are closed. When the landing and car doors are closed, Step S40 is executed while the Step S20 is repeated when they are not. To note, it may be arranged such that the operating conditions of the landing door switch 5 and the car door switch 4 are acquired from the elevator control device 108 through the maintenance device 50 and the acquired operating conditions are checked on the display of the maintenance device 50.

At Step S40, the maintenance engineer removes the soft protector. Step S50 is performed subsequently after the execution of Step S40.

At Step S50, the maintenance engineer removes the hard protector.

In this respect, the soft protector and the hard protector are the functions provided with the UCMP control device 1 to protect the operation of the UCMP control device 1 in the aspect of hardware and software respectively such that the operation mode of the UCMP control device 1 is not switched over to the testing mode during the regular operation.

The soft protector is removed by the maintenance engineer manipulating a dip switch provided on a control panel in which the elevator control device 108 is stored or manipulating the maintenance device 50.

Further, the hard protector is removed by the maintenance engineer manipulating a short connector or a hard switch provided on the control panel or the short connector or the hard switch (which is denoted with the reference sign '70' in FIG. 1) provided at the landing.

To note, when the soft protector is removed, a soft protector removing signal is transmitted to the UCMP control device 1 while when the hard protector is removed, a hard protector removing signal is transmitted to the UCMP control device 1.

When Step S50 is executed and the UCMP control device 1 receives the soft protector removing signal and the hard protector removing signal, the flow of the testing method depicted in FIG. 2 moves to 'software processing' executed by the UCMP control device 1. To note, in the following explanation on 'software processing' (corresponding to Steps S60 to S67), the main role of executing such processing is played by the UCMP control device 1 unless specified otherwise.

As for 'software processing', first, at Step S60 (FIG. 2), it is determined based on the removing data expressed by the respective removing signals as received whether both the soft protector and the hard protector are properly removed. When it is determined that both the soft protector and the hard protector are properly removed (Yes at Step S60), Step S61 (FIG. 3) is executed while a series of processing steps ends when it is determined that they are not properly removed (No at Step S60).

In this respect, according to the testing method depicted in FIG. 2, after the soft protector has been removed, the hard protector is removed (at Steps S40 and S50). This prevents the operation mode of the UCMP control device 1 from being switched over to the testing mode before switch manipulation by the maintenance engineer when the hard protector is removed due to an accidental remove of the soft protector. Thus, at Step S60, when it is determined that the soft protector and the hard protector are both removed, it is further determined whether the hard protector is removed after the soft protector has been removed based on the receiving order of the soft protector removing signal and the hard protector removing signal. Then, if it is determined that the hard protector is removed after the soft protector has been removed, it is determined that both the soft protector and the hard protector are properly removed as mentioned above. On the other hand, if it is determined that the hard protector is not removed after the soft protector has been removed and if it is determined that either one of the soft and hard protectors is not removed or neither of them is removed, it is determined that neither of them is properly removed as mentioned above.

To note, if it is determined at Step S60 that neither of the soft protector and the hard protector is properly removed, the UCMP control device 1 may output an alarm signal indicating that neither of the protectors is properly removed. In this case, when such alarm signal is received by the maintenance device 50, the maintenance engineer can confirm through the maintenance device 50 that either one of the protectors is not properly removed or neither of them is properly removed.

When the soft protector and the hard protector are both properly removed at Step S60, the Steps S61 to S67 depicted in FIG. 3 are sequentially executed in terms of the software processing.

At Step S61, the floor releveling operation by way of the elevator control device 108 is enabled. That is to say, the UCMP control device 1 transmits a command signal to enable the floor releveling operation to the elevator control device 108.

Then, at Step S62, the door opening state, which is detected by the car door switch 4 and the landing door switch during the regular operation, is simulatively set at the UCMP control device 1 by the door opening simulation unit 10 with which the UCMP control device 1 is provided.

At the following Step S63, the testing mode is enabled in the UCMP control device 1. For example, the setting of flags indicating enablement and disablement of the testing mode is altered from disablement (e.g., flag=0) to enablement (e.g., flag=1).

At the following Step S64, it is determined whether the testing mode is enabled through the execution of Step S63. For example, it is determined whether or not the setting of the flags indicating the enablement and disablement of the testing mode is set to enablement. When the testing mode is enabled (Yes at Step S64), Step S65 is executed whereas Step S63 is repeatedly executed when it is not enabled (No at Step S64).

At Step S65, a floor releveling operation permit signal to instruct the execution of the floor releveling operation to the elevator control device 108 is enabled in the elevator control device 108. That is to say, the UCMP control device 1 transmits a command signal to enable the floor releveling operation permit signal in the elevator control device 108 to the elevator control device 108. Thereby, the elevator control device 108, upon receiving the floor releveling operation permit signal, executes the floor releveling operation without disabling such signal.

At the following Step S66, the UCMP control device 1 enables the transmission of a brake actuation permit signal of its own making, thereby, the UCMP control device 1, upon determining that the car is found in an opened door movement state in the testing mode, transmits the brake actuation permit signal so as to place the braking device 102 into a braking condition.

At the following Step S67, the UCMP control device 1 disables the transmission of a motor actuation permit signal of its own making. Thereby, the UCMP control device 1, when the floor releveling operation (Step S70) mentioned below is executed, outputs a power source cut-off command so as to cut off power supply to the electric motor 105.

Step S70 (FIG. 2) is executed following the execution of Step S67. As regards Steps S70 to S100, the operations by the maintenance engineer and the manipulations by the UCMP control device 1 are intermingled with one another.

At Step S70, the floor releveling operation permit signal is transmitted to the elevator control device 108 from the maintenance device 50 by the maintenance engineer manipulating the maintenance device 50. Thereby, the test on the unintended car movement protection device (UCMP test) starts with the execution of the automatic floor releveling operation.

In the UCMP test, first, the elevator control device 108, upon receiving the floor releveling operation permit signal, executes the automatic floor releveling operation of the car 100, at which time the car doors 110 and the landing doors 109 are closed through the execution of Step S20. The car 100 is placed into, so to speak, a free-run condition because the braking device 102 is in its open state and the electric motor 105 does not generate torque due to the automatic floor releveling operation command. Thereby, the traction sheave 103 rotates by unbalanced torque resulting from a weight difference between the car 100 and the counter weight 111, so that the car moves to the ascending (descending) direction through the hoistingway. Then, when the car 100 moves out of the range of the certain specific distance, the UCMP control device 1 determines that the car is found in the unintended car movement state because the opened door detection state is simulatively set and outputs the brake actuation command signal. Thereby, the braking device 102 is placed into a braking condition so that the car 100 is braked so as to be halted.

At the following Step S80, the maintenance engineer and the UCMP control device 1 acquire the operating condition of the car from the elevator control device 108 through the maintenance device 50 and determine whether the UCMP test is over by determining whether the car 100 is halted based on the acquired operating condition. When the maintenance engineer and the UCMP control device 1 determine that the UCMP test is over (Yes at Step S80), Step S90 is executed. On the other hand, when one of the maintenance engineer and the UCMP control device 1 determines that the UCMP test is not over (No at Step S80), either of them continues checking the operating condition of the car through the maintenance device 50. That is to say, in this case, the operation of the car under the UCMP test (S70) continues.

When the maintenance engineer and the UCMP control device 1 confirm that the halt of the car 100, that is, the completion of the UCMP test at Step S80, they execute processing to make the operation mode of the UCMP control device 1 reinstated to the regular mode from the testing mode at Steps S90 and S100.

At Step S90, the UCMP control device 1 removes the simulative setting of being in the opened door detection state. Further, at Step S100, the maintenance engineer and the UCMP control device 1 disables various settings (Steps S65 to S67) in the testing mode of the UCMP control device 1 through the manipulation of the maintenance device 50 and as such.

When Steps S90 and S100 are executed and the operation mode of the UCMP control device 1 is reinstated to the regular mode from the testing mode, a series of processing steps depicted in FIGS. 2 and 3 according to the testing method for the unintended car movement protection device ends. Thereafter, the maintenance engineer measures the braking distance of the halted car 100 to evaluate the test results.

Figure 4:
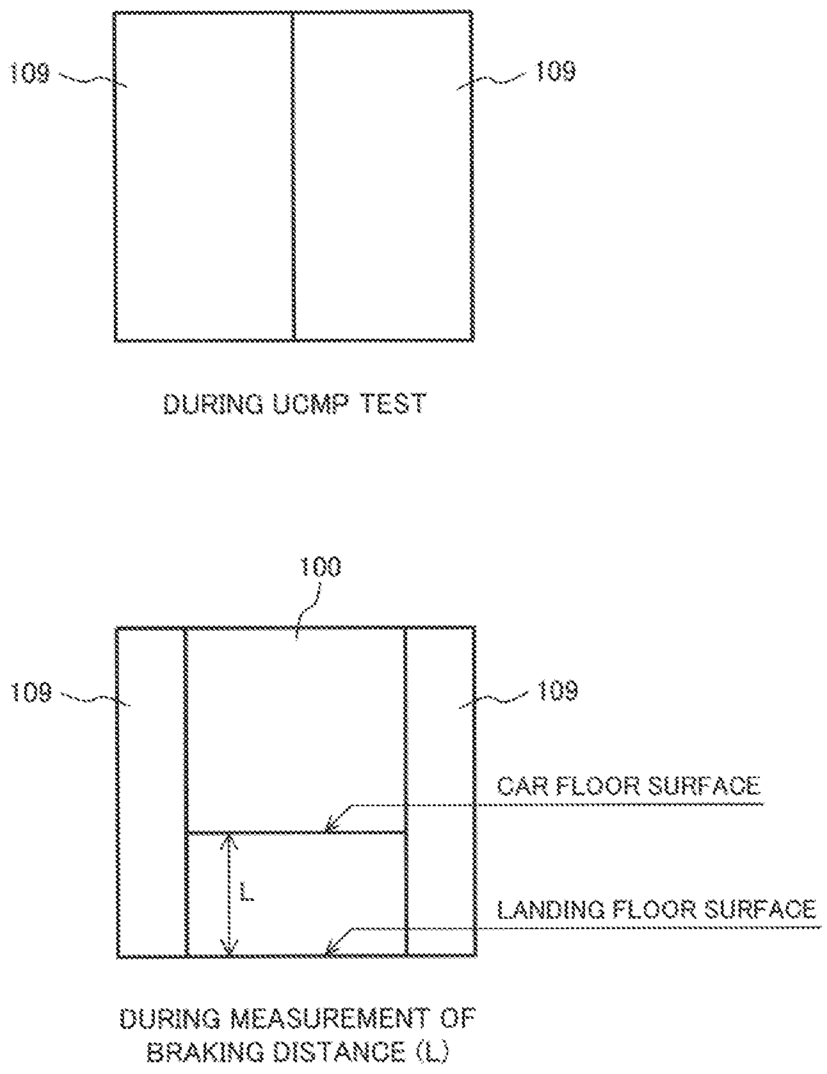
FIG. 4 shows frontal views of a landing door and a car seen from a landing side during the UCMP testing and the measurement of a braking distance.

FIG. 4 shows frontal views of the landing door 109 and a car 100 seen from a landing side during the UCMP testing and the measurement of the braking distance.

As illustrated in the upper view of FIG. 4, the landing door 109 is closed during the UCMP testing and the car 100 found in the hoistway or on the move is not exposed facing the landing. Thereby, high safety is secured for the testing operation at the landing.

As illustrated in the lower view of FIG. 4, the maintenance engineer who measures the braking distance opens the landing door 109 and measures the distance between the car floor surface and the landing floor surface, which distance is defined as the braking distance L. To note, the respective doors do not have to be opened as long as the measurement of the braking distance L is feasible.

According to the present embodiment described above, upon checking the operation of the unintended car movement protection device, since the automatic floor releveling operation is executed by enabling the floor releveling operation by the elevator control device and the car is moved by unbalanced torque, the time required for the car to move can be shortened. Further, because the opened door state is simulatively set, the car door and the landing doors can be placed into the closed door state when the car is moved through the automatic floor releveling operation and the unbalanced torque. Thus, the safety of the testing operations improves, so that the time required for the safety measures to be taken can be shortened. The above arrangements allow the time required for the operation test of the unintended car movement protection device to be performed to be shortened.

Further, the control device of the unintended car movement protection device operates for testing according to the removing of the soft protector and the hard protector which prevent the unintended car movement protection device from operating for testing during the regular operation, so that the enablement and setting of a variety of functions when checking the operation of the protection device are automatically executed. Thereby, the time required for the operation test of the unintended car movement protection device to be performed can be shortened. Further, by removing the hard protector after the soft protector has been removed, it is possible to prevent the mistaken transition to the testing mode during the regular operation or the removing operation of the protectors.

Moreover, by executing the floor releveling operation through the manipulation of the maintenance device and removing the protectors by means of the maintenance device and the removing means installed at the landing, it is possible to facilitate the testing operation at the landing.

It should be noted that the present invention is not limited to the above-described embodiment and can encompass various modified examples. For instance, the above-described embodiment is presented in detail here to facilitate the explanation of the present invention, so that the present invention is not necessarily limited to what is provided with all the features explained here. Further, additions of the other configuration, deletion, replacements for some of the configuration of the embodiment are possible.

For example, the elevator may be one provided with a machine room or a so-called machine-room-less elevator.

Furthermore, the number of floors of a building in which an elevator is installed may be arbitrarily provided. Accordingly, the number of landing doors in pair may correspond to the arbitrary number of floors.

REFERENCE SIGNS LIST

1 . . . UCMP Control Device,
2 . . . Position Sensor,
3 . . . Detection Object,
4 . . . Car Door Switch,
5 . . . Landing Door Switch,
10 . . . Door Opening Simulation Unit,
50 . . . Maintenance Device,
60 . . . Group of Maintenance Switches,
70 . . . Short Connector or Hard Switch,
100 . . . Car,
101 . . . Main Rope,
102 . . . Braking Device,
103 . . . Traction Sheave,
104 . . . Deflector Sheave,
105 . . . Electric Motor,
106 . . . Encoder,
107 . . . Power Converter,
108 . . . Elevator Control Device,
109 . . . Landing Door,
110 . . . Car Door,
111 . . . Counter Weight,
115 . . . Landing

The invention claimed is:

1. A testing method for an unintended car movement protection device for an elevator to check an operation of the unintended car movement protection device with which an elevator system is provided, the method comprising:

moving a car to a position where a floor releveling operation is enabled;

making the unintended car movement protection device operate for testing, enabling the floor releveling operation by an elevator control device to control the car by way of a command signal from a control device of the unintended car movement protection device while the control device of the unintended car movement protection device simulatively sets an opened door detection state in which a car door or a landing door are detected to be opened and a power cut-off command signal to be outputted to an electric motor to drive the car;

performing the floor releveling operation by way of the elevator control device in such a closed door state that the car door and the landing door are closed; and checking an operation of the unintended car movement protection device by making the car in the closed door state move by unbalanced torque in accordance with the power cut-off command signal when the car lands on a releveled floor through the floor releveling operation.

2. The testing method for an unintended car movement protection device for an elevator according to claim 1, the method comprising:

removing a protector for preventing the unintended car movement protection device from operating for testing during a regular operation; and the unintended car movement protection device operates for testing according to the removing of the protector.

3. The testing method for an unintended car movement protection device for an elevator according to claim 2, wherein the protector includes a soft protector and a hard protector; and the unintended car movement protection device operates for testing according to the removing of the soft protector and the hard protector.

4. The testing method for an unintended car movement protection device for an elevator according to claim 3, the method comprising:

removing the hard protector after the soft protector is removed; and the unintended car movement protection device operates for testing when the hard protector is removed after the soft protector is removed.

5. The testing method for an unintended car movement protection device for an elevator according to claim 3, wherein the soft protector is removed by manipulating a dip switch provided on a control panel or a maintenance device which is connected to the elevator control device and the unintended car movement protection device in a communicative manner; and the hard protector is removed by manipulating a short connector or a hard switch provided on the control panel or a landing.

6. The testing method for an unintended car movement protection device for an elevator according to claim 1, wherein the floor releveling operation by way of the elevator control device is executed by manipulating a maintenance device which is connected to the elevator control device and the unintended car movement protection device in a communicative manner.

7. The testing method for an unintended car movement protection device for an elevator according to claim 6, further characterized in that a maintenance operation is executed by manipulating the maintenance device.

8. The testing method for an unintended car movement protection device for an elevator according to claim 1, wherein a braking distance of the car is measured by opening the car door and the landing door after the car is moved by way of the unbalanced torque and the car is halted by the unintended car movement protection device.

9. An unintended car movement protection device for an elevator comprising:

an opened or closed door detector including a car door switch and a landing door switch;

a position detector for detecting a position of a car in a hoistway; and a control device configured to place a braking device into a braking mode and to cut off power supply to an electric motor to drive the car when it is determined based on a signal from the opened or closed door detector and the position detector respectively that the car entails unintended car movement, wherein the control device enables a floor releveling operation by way of an elevator control device in such a closed door state that the car door and the landing door are closed, to control an operation of the car when making the unintended car movement protection device operate for testing to check an operation of the unintended car movement protection device while simulatively setting an opened door detection state of the opened or closed door detector, in which the car door or the landing door are detected to be opened and a power cut-off command signal to be outputted to the electric motor to drive the car, and wherein the elevator control device is configured to check the operation of the unintended car movement protection device by making the car in the closed door state move by unbalanced torque in accordance with the power cut-off command signal when the car lands on the releveled floor through the floor releveling operation.

* * * * *